(12) United States Patent
Terayama et al.

(10) Patent No.: US 10,986,006 B2
(45) Date of Patent: Apr. 20, 2021

(54) PERFORMANCE ANALYSIS METHOD AND MANAGEMENT COMPUTER

(71) Applicant: HITACHI, LTD., Tokyo (JP)

(72) Inventors: Atsumi Terayama, Tokyo (JP); Shinichi Hayashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/286,121

(22) Filed: Feb. 26, 2019

(65) Prior Publication Data
US 2019/0334795 A1 Oct. 31, 2019

(30) Foreign Application Priority Data

Apr. 25, 2018 (JP) .............................. JP2018-083972

(51) Int. Cl.
*H04L 12/26* (2006.01)
*H04L 12/24* (2006.01)

(52) U.S. Cl.
CPC .......... *H04L 43/08* (2013.01); *H04L 41/0893* (2013.01); *H04L 41/0896* (2013.01); *H04L 43/0876* (2013.01); *H04L 43/16* (2013.01)

(58) Field of Classification Search
CPC ..... H04L 43/08; H04L 43/0876; H04L 43/16; H04L 41/0893; H04L 41/0896
See application file for complete search history.

(56) References Cited

U.S. PATENT DOCUMENTS

| 7,292,531 | B1* | 11/2007 | Hill ...................... H04L 41/0896 370/230.1 |
| 9,485,160 | B1* | 11/2016 | Brooker .................. G11C 7/22 |
| 2002/0156884 | A1* | 10/2002 | Bertram ............... H04L 41/142 709/224 |
| 2008/0270851 | A1 | 10/2008 | Ochi et al. |
| 2011/0161743 | A1 | 6/2011 | Kato |
| 2011/0295993 | A1 | 12/2011 | Ochi et al. |
| 2014/0173363 | A1 | 6/2014 | Kato |
| 2018/0139180 | A1* | 5/2018 | Napchi ................... G06F 16/80 |
| 2019/0132206 | A1* | 5/2019 | Hanes ................. H04L 41/0896 |

FOREIGN PATENT DOCUMENTS

JP 2008-276279 A 11/2008
WO 2010-032701 A1 3/2010

OTHER PUBLICATIONS

Japanese Office Action dated Jun. 16, 2020 for the Japanese Patent Application No. 2018-083972.

* cited by examiner

*Primary Examiner* — Michael C Lai
(74) *Attorney, Agent, or Firm* — Volpe Koenig

(57) ABSTRACT

A performance analysis method of a computer system using a management computer. The management computer includes: a processor; and a memory device in which a program to be executed by the processor is stored. The computer system is constituted by a plurality of resources. The processor divides the plurality of resources into a plurality of resource groups based on a correlation of changes in performance data between the resources, and analyzes the performance data for each of the divided resource groups.

10 Claims, 14 Drawing Sheets

FIG. 5

STORAGE PERFORMANCE INFORMATION 211

| RESOURCE ID | | METRICS | 2012-01-01, 10:23:00 UTC | 2012-01-01, 10:24:00 UTC | 2012-01-01, 10:25:00 UTC | 2012-01-01, 10:26:00 UTC |
|---|---|---|---|---|---|---|
| Port 0F | | Response Time [ms] | 231 | 200 | 98 | 130 |
| | | IOPS | 531 | 562 | 123 | 192 |
| | | Transfer Rate [KB/s] | 20,032 | 21,031 | 4,220 | 9,213 |
| | | ... | ... | ... | ... | ... |
| Cache 001 | | Usage Rate [%] | 20 | 19 | 13 | 10 |
| | | Write Pending Rate [%] | 31 | 35 | 40 | 48 |
| | | ... | ... | ... | ... | ... |
| SP102 | | Used Capacity [%] | 66 | 67 | 67 | 67 |
| | | IOPS | 2345 | 2352 | 2011 | 2020 |
| | | Transfer Rate [KB/s] | 120,321 | 120,301 | 120,221 | 119,829 |
| | | ... | ... | ... | ... | ... |
| RG030 | | Drive Busy Rate [%] | 43.1 | 41.0 | 40.7 | 41.4 |
| | | Used Capacity [%] | 77 | 78 | 78 | 79 |
| | | Transfer Rate [KB/s] | 18,123 | 18,320 | 17,023 | 17,748 |
| | | ... | ... | ... | ... | ... |

FIG. 6

INSTANCE CONFIGURATION INFORMATION 212

| | | INSTANCE ID | | |
|---|---|---|---|---|
| | | A001 | A002 | B330 |
| GENERAL (212a) | TEMPLATE | Web-std | DB-ext | App-gen |
| | NAME | web_svr-01 | DB 04 | Test-t001 |
| | SYSTEM NAME | SYS-201 | SYS-093 | SYS-201 |
| | TYPE | VIRTUAL | PHYSICAL | VIRTUAL |
| | OWNER | Group67::User1 | Group67::User2 | Group67::User1 |
| SERVER (212b) | ID | SVR 01V | SVR 01P | SVR f0V |
| | CPU | 2GHz x4 | 3.2GHz x16 | 2GHz x2 |
| | RAM | 8GB | 16GB | 4GB |
| | ... | | | |
| NETWORK (212c) | NIC1 | veth0 | eth0 | veth0 |
| | NIC2 | veth1 | eth1 | - |
| | NIC3 | - | - | - |
| | ... | | | |
| STORAGE (212d) | DISK ID | D01-203, D01-204 | D02-001, D02-002 | D03-201 |
| | TYPE | VIRTUAL | PHYSICAL | VIRTUAL |
| | Capacity | 120GB/500GB | 160GB/500GB | 300GB |
| | VOLUME | VL 02:30 | VL1A:01 | VL1A:02 |
| | ... | | | |

212-1     212-2     212-3

FIG. 8
RESOURCE GROUP MANAGEMENT TABLE

| GROUP ID | RESOURCE ID | METRICS |
|---|---|---|
| Group 1 | Port 01 | Response Time |
| | | IOPS |
| | | Transfer Rate |
| | Port 02 | Response Time |
| | | IOPS |
| | | Transfer Rate |
| | ... | ... |
| | Processor 08 | Usage Rate |
| | ... | ... |
| | SP102 | Used Capacity |
| | | IOPS |
| | | Transfer Rate |
| | ... | ... |
| | RG 015 | Driver Busy Rate |
| | | Used Capacity |
| | | Transfer Rate |
| ... | | |
| Group 2 | Port 01 | ... |
| | ... | |
| | RG 061 | ... |
| ... | | |
| Group 4 | VL D2:FF | ... |
| ... | | |
| Group 5 | Processor 32 | ... |
| | ... | |
| | Copy Task 26 | ... |

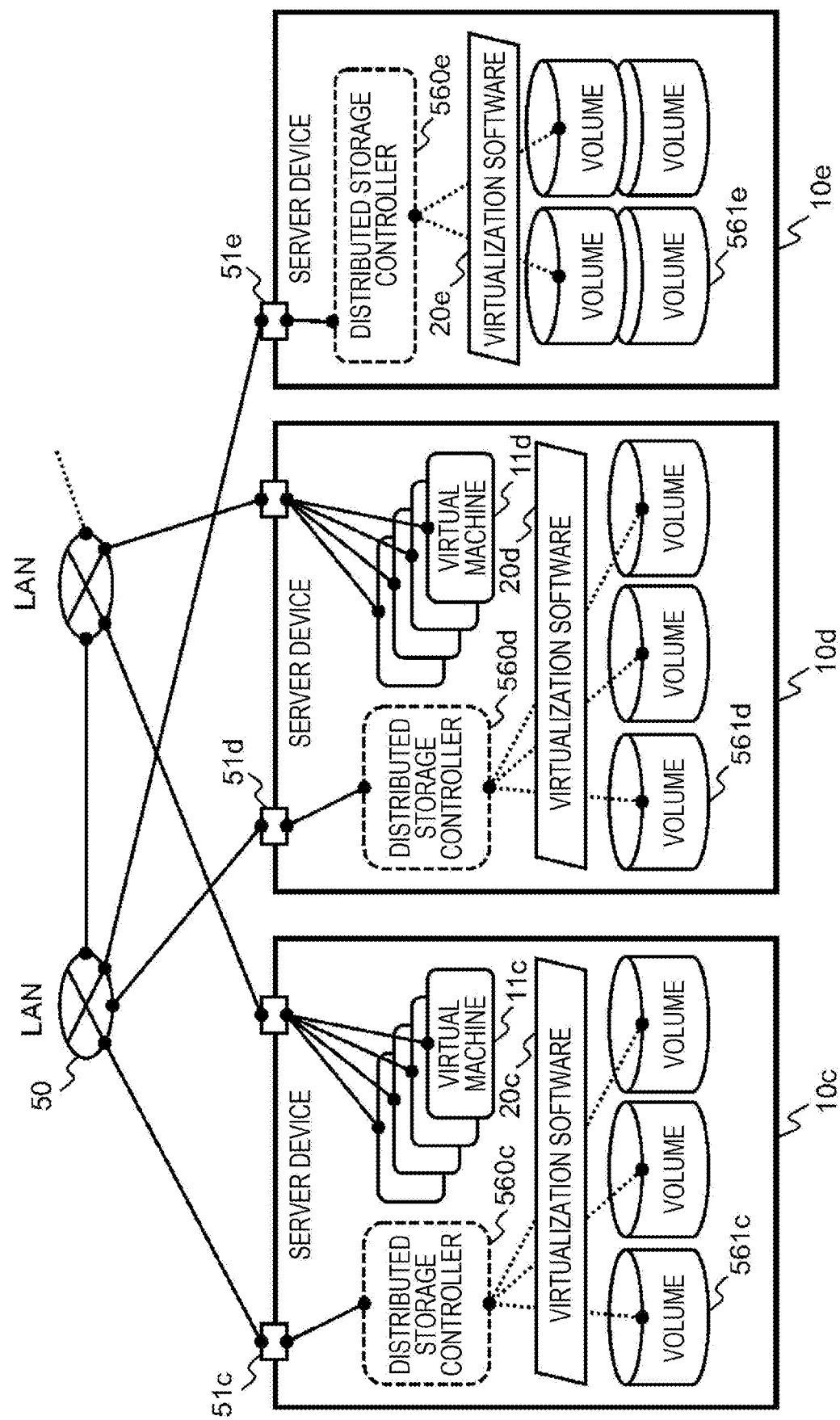

PERFORMANCE ANALYSIS METHOD AND MANAGEMENT COMPUTER

BACKGROUND OF THE INVENTION

1. Field of the Invention

The present invention relates to a performance analysis method and a management computer. This application is based on and claims the benefit of priority from Japanese Patent Application No. 2018-0883972, the contents of which are incorporated by reference.

2. Description of the Related Art

In recent years, service utilizing information systems (computer systems) has been common, and scales of the information systems have increased. In addition, not only physical failure but also response deterioration due to tightness of resource performance also occurs in the information system. Causes of such occurrence include not only activation of processing of a higher-level application but physical and partial failure and the like are also underlying causes. Therefore, and the causes are complicatedly intertwined and become a large scale, so that it is difficult to analyze the causes.

In conventional operation management techniques, there are many implementation examples in which a certain threshold is set for an output item of performance monitoring software, and a performance behavior that does not occur in normal operating conditions is found with a trigger of exceeding the threshold, as disclosed in, for example, U.S. Pat. No. 9,485,160.

SUMMARY OF THE INVENTION

Even when the conventional operation management method as disclosed in U.S. Pat. No. 9,485,160 is used, the number of output items of the performance monitoring software becomes enormous in a large-scale information system so that it is difficult to perform analysis because factors are complicatedly intertwined.

Therefore, an object of the present invention is to make it possible to analyze performance of a computer system regardless of a scale.

A representative performance analysis method according to the present invention is a performance analysis method of a computer system using a management computer. The management computer includes: a processor; and a memory device in which a program to be executed by the processor is stored. The computer system includes a plurality of resources. The processor divides the plurality of resources into a plurality of resource groups based on a correlation of changes in performance data between the resources, and analyzes the performance data for each of the divided resource groups.

According to the present invention, the performance of the computer system can be analyzed regardless of the scale.

BRIEF DESCRIPTION OF THE DRAWINGS

FIG. 5 is a diagram illustrating an example of storage performance information;

FIG. 6 is a diagram illustrating an example of instance configuration information;

FIG. 8 is a diagram illustrating an example of a resource group management table;

FIG. 14 is a diagram illustrating an example of a distributed software storage environment.

DESCRIPTION OF THE PREFERRED EMBODIMENTS

According to the present embodiment, provided are a method and a device that enable efficient analysis in performance analysis of a computer system (storage device) shared by a plurality of workloads.

<Physical Configuration and Logical Configuration>

Figure 1:
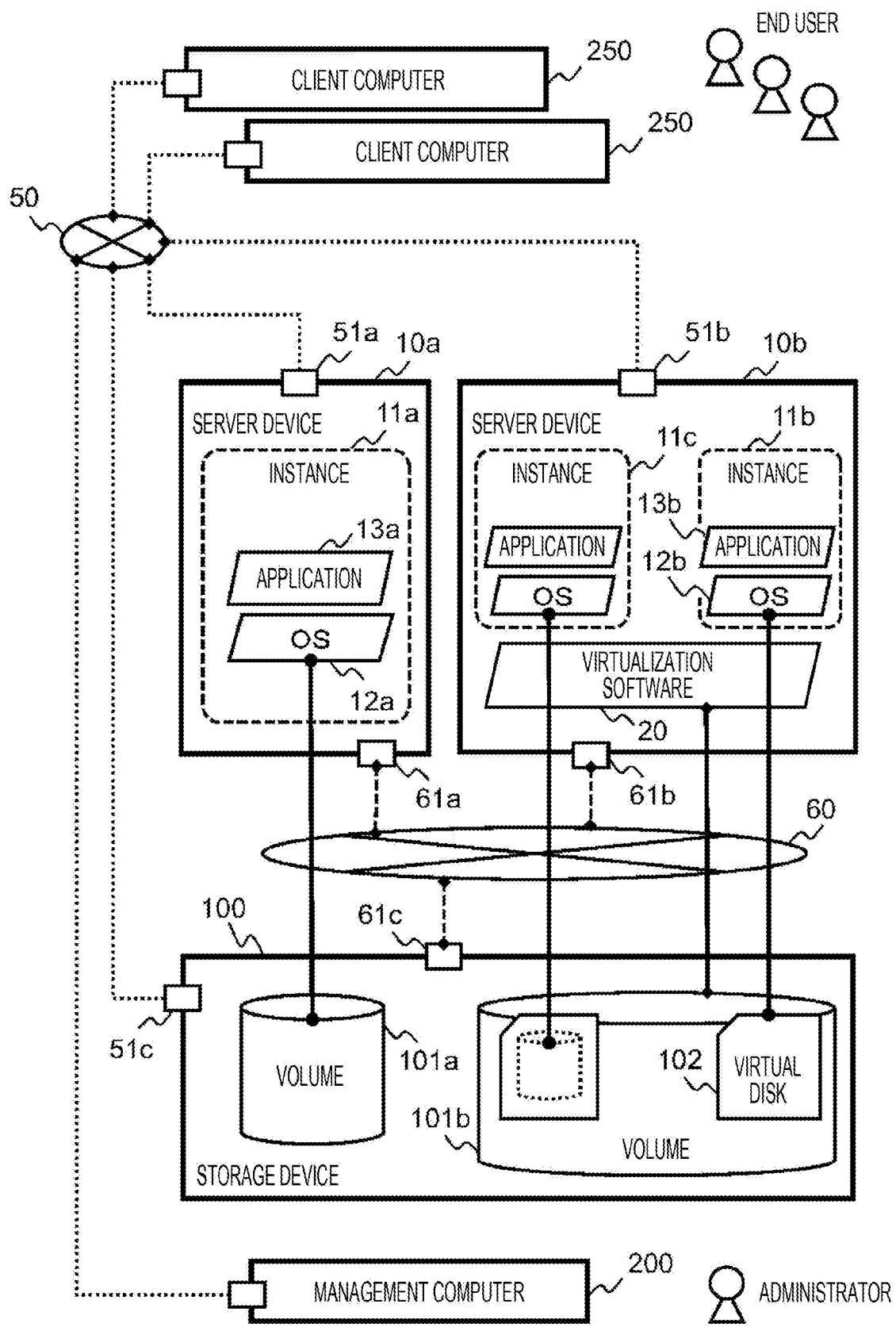
FIG. 1 is a diagram illustrating an example of a computer system.

FIG. 1 illustrates an example of a computer system. The computer system illustrated in FIG. 1 includes one or more server devices 10, one or more storage devices 100, a management computer 200, and a network 50 connecting these members with each other. When indicating either a server device 10a or a server device 10b without specifying one of them, the reference sign 10 will be used (the server device 10), and the other reference signs will be used in the same format.

In the server device 10, an application 13 operates to provide information service to an operator (users) of the computer system. The user uses the server device 10 via a client computer 250.

The network 50 is not necessarily shared by the client computer 250 and the storage device 100 or the server device 10 and the storage device 100, and a dedicated network 60, for example, may be configured for the purpose of connecting the server device 10 and the storage device 100.

Alternatively, a network (not illustrated) may be configured separately according to a purpose of use by providing communication between the application 13 (server device 10) and the user (client computer 250) as a service network or providing communication between the management computer 200 and the server device 10 as a management network.

The server device 10 has a general computer architecture configured to operate the application 13. The configuration of the plurality of server devices 10 is not necessarily the same, and the server device 10a, which is a bare metal server device in which an operating system (OS) 12 directly operates in the server device 10, may be used.

Alternatively, the server device 10b, which is a virtualized server device that further operates virtualization software 20 or a container engine (not illustrated), may be used for the purpose of dynamically dividing or multiplexing a logical system area (instance 11) used by the application 13 and the OS 12.

Generally, a system that performs pay-per-use charging for such system areas directly, an application environment built in the system area, and IT service provided by the application is adopted in the cloud service.

Here, the instance 11 is the environment which is an object of the service used by the user and conforms to the system area. Further, a processing load imposed by the application 13 in the instance 11 and a processing load required for the instance 11 itself to operate are collectively referred to as a workload, and these loads dynamically change depending on a use situation of the user.

The network 50 may directly connect the devices communicating via the network 50 with each other, but may include one or more network switches or routers (not illustrated) in order to form a plurality of communication paths. In addition, the network may be physically and logically divided according to roles or characteristics of data to be transmitted, and general division in the related art may be used for such division.

For this purpose, a technique of logically dividing and multiplexing a network space such as a virtual local area network (VLAN) may be used. In addition, the dedicated network 60 may be a network such as a storage area network (SAN) which uses a dedicated physical device and a communication protocol.

Further, the server device 10 and the storage device 100 have a network interface conforming to a communication protocol for mutual communication via the network 50 or the dedicated network 60.

The storage device 100 is a nonvolatile memory device, and provides functions such as storing data and duplicating data to be available by the server device 10. A storage area in which data is stored from the server device 10 is generally recognized as a storage device, and the storage device 100 controls such a storage area as a logical volume 101.

A file system, which allows the OS 12 to manage the storage area, is configured in the volume 101. When the virtualization software 20 operates, a virtual disk 102 is sometimes configured as a file on the file system in order to further divide the volume 101, but the functions that the storage device 100 needs to have as the memory device are the same regardless of any example.

In the present embodiment, an object to be controlled by the storage device 100 is the volume 101 according to a general implementation example of the memory device, and the storage device 100 does not have information on how the server device 10 creates the virtual disk 102.

The management computer 200 is configured to intensively manage a configuration and an operating state of the computer system, and is mainly used by an administrator in charge of operation management of the computer system. There is no need of sharing the single management computer 200, and a plurality of the management computers 200 may be configured for the purpose of redundancy or load distribution in order to improve reliability. In addition, the management computer 200 may be used for processing other than management.

Figure 2:
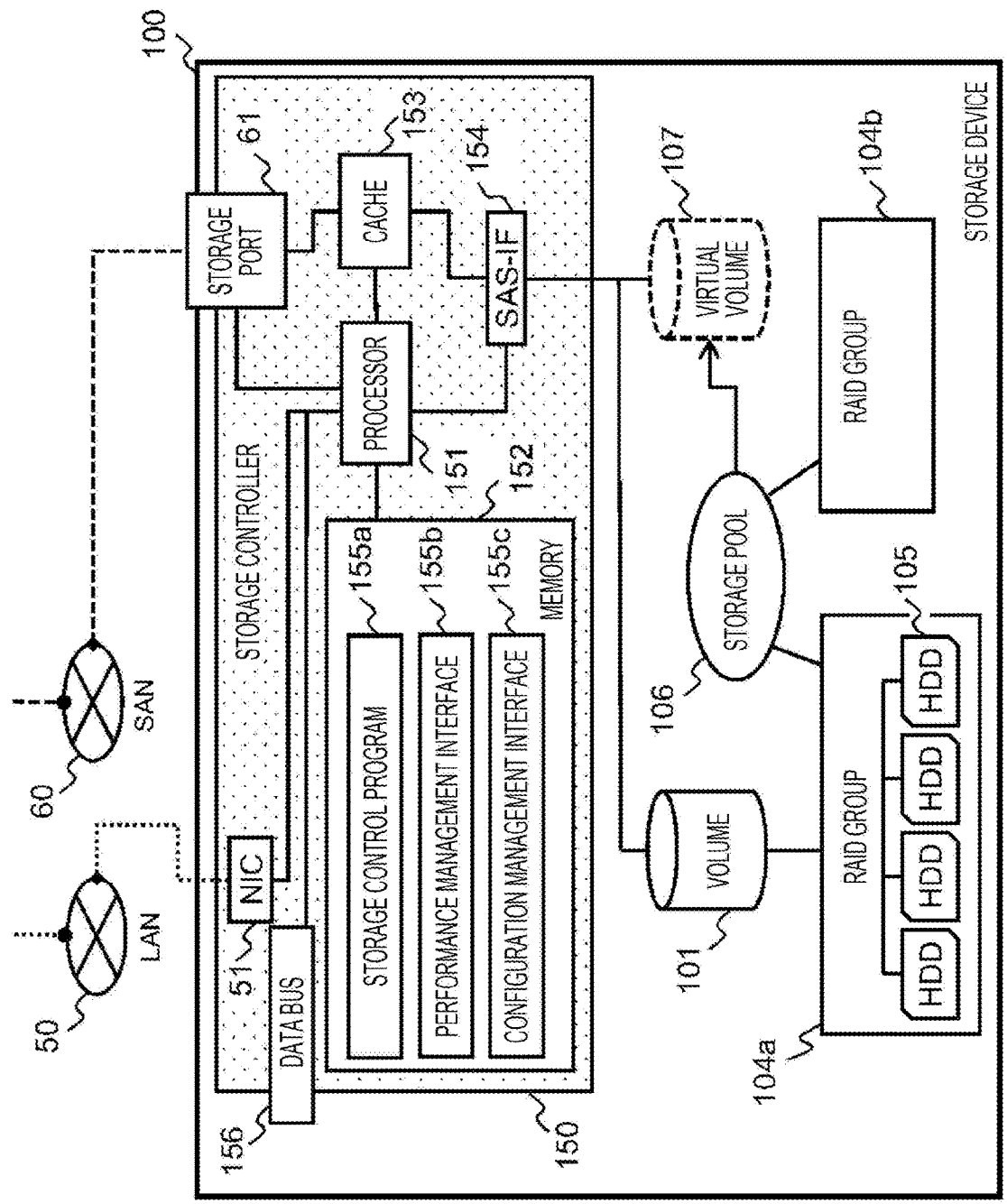
FIG. 2 is a diagram illustrating an example of a storage device.

FIG. 2 is a diagram illustrating an example of the storage device 100. The storage device 100 includes a storage controller 150 configured to manage the configuration of the storage device 100 and to operate as the memory device. A structure of the storage controller 150 conforms to a computer architecture.

The storage controller 150 includes a processor 151, a memory 152, a storage port 61 which is a communication interface, a network interface card (NIC) 51, a cache 153, a SAS-IF 154 which is a back-end interface, and a data bus 156 connecting these members with each other.

Since the storage port 61 or the cache 153 directly relates to input/output performance of the storage device 100, a plurality of the storage ports 61 or the caches 153 may be mounted in accordance with the number of the server devices 10 to be connected. A plurality of the storage controllers 150 including the storage port 61, the cache 153, or the like may be provided in the storage device 100.

In the storage controller 150, the processor 151 reads the storage control program 155a stored in the memory 152 and executes the read program as a process in order to process a data read/write request from the server device 10.

The storage control program 155a may include a program configured to provide a flow rate management function of the storage port 61, an in-device copy function to copy data of a volume 101, or an inter-device copy function to perform copying (replication) to another storage device case in addition to the processing of the data read/write request.

Further, the storage control program 155a may include a program configured to provide a cache management function to set an upper limit of use of the cache 153, a storage media tiering function to change a type of a drive device to be allocated in accordance with a use frequency of a storage area, or a Web server function serving as a user interface.

Incidentally, the additional functions other than the processing of the data read/write request, such as the above-described copy function, will be simply referred to as a storage function hereinafter in order to simplify the description. When providing the storage function, a resource of the storage device 100, which is the same as a resource for the processing of the data read/write request, is consumed, and a processing load is applied to the storage device 100 in addition to the workload by the application 13.

In addition, the memory 152 stores a program of a performance management interface 155b configured to manage performance information of the storage device 100 and a program of a configuration management interface 155c configured to manage configuration information. These programs are programs configured to allow information to be changed from the outside or information to be referred to from the outside.

However, another embodiment may be adopted, and these programs may be included in the storage control program 155a as long as an interface of information with the outside can be provided.

The storage device 100 includes a plurality of drive devices 105 configured to store data. The drive device 105 referred to herein indicates a so-called hard disk drive (HDD) or solid state drive (SSD), and the reliability and input/output performance is enhanced by a mechanism that causes the plurality of drive devices 105 to cooperate such as redundant arrays of inexpensive disks (RAID).

In the storage device 100, the configuration of the drive device 105 is not constant, and replacement, an increase, and a decrease can be implemented in the unit of the drive device 105 due to failure or capacity shortage. In addition to the configuration of the HDD illustrated in FIG. 2, the drive device 105 may be an SSD or a flash memory device, and the drive devices 105 having different capacities, latencies, or transfer bands may be mixedly mounted.

The storage device 100 includes the SAS-IF 154 and the storage control program 155a corresponding to the drive device 105 such that the drive device 105 can be used. Then, it is important that each part of the storage device 100 continuously performs a normal operation in order to realize the service of the computer system.

However, it is difficult to simply detect failure or malfunction since the storage device 100 has a large number of constituent parts, and performance analysis based on efficient management for aggregation of information from a large amount of monitoring data is required. One object of the present embodiment is to analyze the resource performance in the storage system such as the storage device 100 and find an abnormal behavior.

As described above, the storage device 100 logically provides the volume 101 to the server device 10. The volume 101 is a logical structure in the sense that a physically corresponding tangible object does not exist directly, which is different from the drive device 105.

The storage device 100 does not directly form the storage area of the drive device 105 as the volume 101, but has logical structures such as a RAID group 104 and a storage pool 106, and these configurations are managed by the storage controller 150.

For example, the plurality of drive devices 105 constitute one RAID group 104, and a storage capacity of the RAID group 104 is managed as the storage pool 106 constituted by one or more RAID groups 104.

Further, a virtual volume 107 to be provided to the server device 10 is allocated from the storage pool 106, and is connected to the server device 10 via the SAN 60, the storage port 61, or the like, thereby being recognized as a storage device from the server device 10.

Both the volume 101 and the virtual volume 107 are recognized as storage devices by the server device 10 although the virtual volume 107 dynamically allocated from the storage pool 106 is distinguished by being called the virtual volume in some cases.

In addition, switches forming the storage port 61 or the SAN 60 perform access control such as LUN security (HSD: Host Storage Domain) or zoning in some cases for the purpose of controlling communication availability between the volume 101 and the virtual volume 107, and the server device 10.

In addition, specific areas of the cache 153 are allocated to the plurality of volumes 101, respectively, thereby enhancing the input/output performance. The data output from the server device 10 is recorded in the drive device 105 via hierarchically continuous logical structure and physical structure.

However, it is extremely difficult for a general block storage system including the storage device 100 or the storage controller 150 to detect a use situation such as what kind of structure the data recorded in the volume 101 has and what kind of meaning the data has.

This is because the file system is further created in the volume 101 or the virtual disk 102 is created by processing outside the storage device 100 such as the OS 12 of the server device 10 and the virtualization software 20, but the storage device 100 does not distinguish the management information related to such creation from other data.

The storage functions provided by the storage controller 150, such as the copy function and a capacity reduction function may include a function that is applied to the logical structure of the volume 101, the virtual volume 107, or the storage pool 106 without being limited to the physical structure.

Since characteristics such as performance and capacity are associated with the volume 101, the virtual volume 107, or the storage pool 106, there is a case where the logical structure is used as one expression format when the user sets a storage requirement.

For example, the logical structure is used for setting when the user allocates the storage pool 106 which has a large capacity and operates at a low speed for a test of a system or when the user allocates the storage pool 106 which operates at a high speed and is independent without being shared with other systems in the production environment.

When monitoring the performance of the storage device 100, a performance value is measured not only for the physical structure but also for the logical structure. As described above, when the single logical structure is defined with physically separate structures, the structures operate cooperatively, and thus, the performance value is also measured for the logical structure.

Hereinafter, a constituent element that serves as an object to be measured will be referred to as a resource, and a performance value that needs to be used as an indicator will be referred to as a metric unless otherwise specified. The resource is, for example, the volume 101 or the cache 153, and the metric is, for example, a use rate, a transfer amount, a response time, or the number of processing input/output per unit time (IOPS).

There is also a case where the performance value is not monitored even if the performance value can be measured technically, and whether there is a metric available from the outside of the storage device 100 is defined by a monitoring program (storage performance management program 202) of the management computer 200 in the present embodiment.

In addition, the storage function other than the basic function related to input/output is the constituent element that apply a processing load to the storage device 100, and thus, there is a case where a process or a task, configured to realize the storage function operated by the storage controller 150 is defined as a kind of resource. Further, an execution situation of the resource related to the storage function may be observed and managed by the storage performance management program 202 similarly to the other resources.

Figure 3:
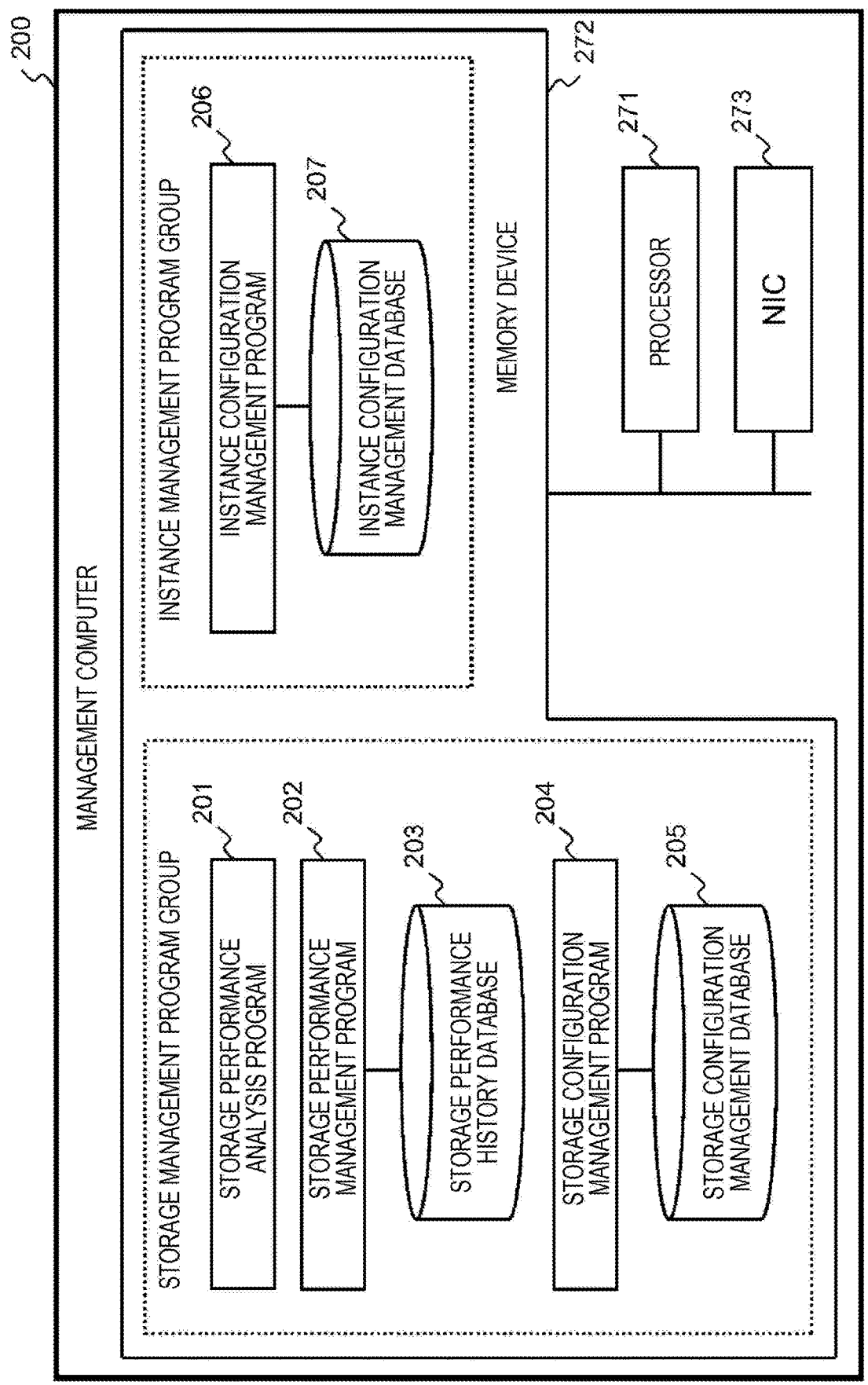
FIG. 3 is a diagram illustrating an example of a management computer.

FIG. 3 is a diagram illustrating an example of the management computer 200. In the management computer 200 according to the present embodiment, a storage management program group configured to manage the storage device 100 and an instance management program group configured to manage the instance operated by the server device 10 are operated.

The management computer 200 itself may be a general computer, and includes a processor 271 executing a program, a memory device 272 in which the program and data are stored, and a NIC 273 for connection with the network 50. The memory device 272 may be a memory, an HDD, an SDD, or the like.

The storage management program group includes a storage performance analysis program 201, a storage performance management program 202, and a storage configuration management program 204. The storage configuration management program 204 is a program configured to change or acquire information on the physical structure and the logical structure of the storage device 100 in cooperation with the storage controller 150 of the storage device 100 and store the information in a storage configuration management database 205.

The storage performance management program 202 is a program configured to acquire performance of each resource of the storage device 100 in cooperation with the storage device 100 and store the performance in a storage performance history database 203.

The storage performance analysis program 201 is the main constituent element characterizing the present embodiment, and is a program configured to analyze performance information provided by the storage performance management program 202 to aggregate a large amount of performance information into a small number of statistics or to extract a characteristic behavior.

A person who mainly uses the storage performance analysis program 201 as a role of analyzing the computer system from the viewpoint of performance and utilizing the analysis for operation management tasks is sometimes referred to as an analyst.

The instance management program group includes an instance configuration management program 206. The instance configuration management program 206 is a program configured to change or acquire the configuration of the instance of the server device 10 in cooperation with the server device 10 and store the instance configuration in the instance configuration management database 207.

The instance management program group is independent from the storage configuration management program group in the sense that it is unnecessary to be synchronized with the storage configuration management program group one by one. For example, in a general operation mode for a cloud system such as self-service, users are free to consume resources within an allowed range, and creation and change of instances and creation and change of the virtual disk 102 are performed independently.

Further, the volume 101 is managed by the storage management program group, but the storage management program group does not manage how the virtual disk 102 is configured in the volume 101.

For example, if a storage area having a large capacity is required according to the requirement of the application 13, the instance may use a plurality of the volumes 101 in a bundle to expand the virtual disk 102. In addition, if there is a space in the capacity of the volume 101 used by an instance, the virtual disk 102 to be used by another instance may be created on the same volume 101 to share the volume 101.

Since such usages of volume 101 are carried out in the management of the server device 10, the storage management program group of the management computer 200 does not manage such usages and does not have information on such usages.

With such an interface, the cloud system separates a configuration change of a physical infrastructure requiring a management load from a configuration change of the instance, and realizes a function to provide a resource necessary for the user at a necessary time.

The instance management program group obtains information on a workload state derived from the user since a resource requirement of an instance depends on a hardware requirement of the application 13 executed by the user. On the other hand, the storage management program group is independent of the instance management program group, and thus, does not obtain information on the workload state of the user.

The four programs of the management computer 200 described above are configured to manage the computer system, and are sometimes collectively referred to simply as a management program hereinafter for the sake of description. Incidentally, the management program is divided into the storage management program group and the instance management program group for convenience, but is not necessarily divided, or may be a program having another configuration.

In addition, the four management programs are not necessarily operated by the single management computer 200, and may be operated by being distributed among a plurality of computers. Each management program may further include a user interface configured to display information to the user and enables the user to input information, and may include an application programming interface (API) in a general format configured to cooperate with another program.

Figure 4:
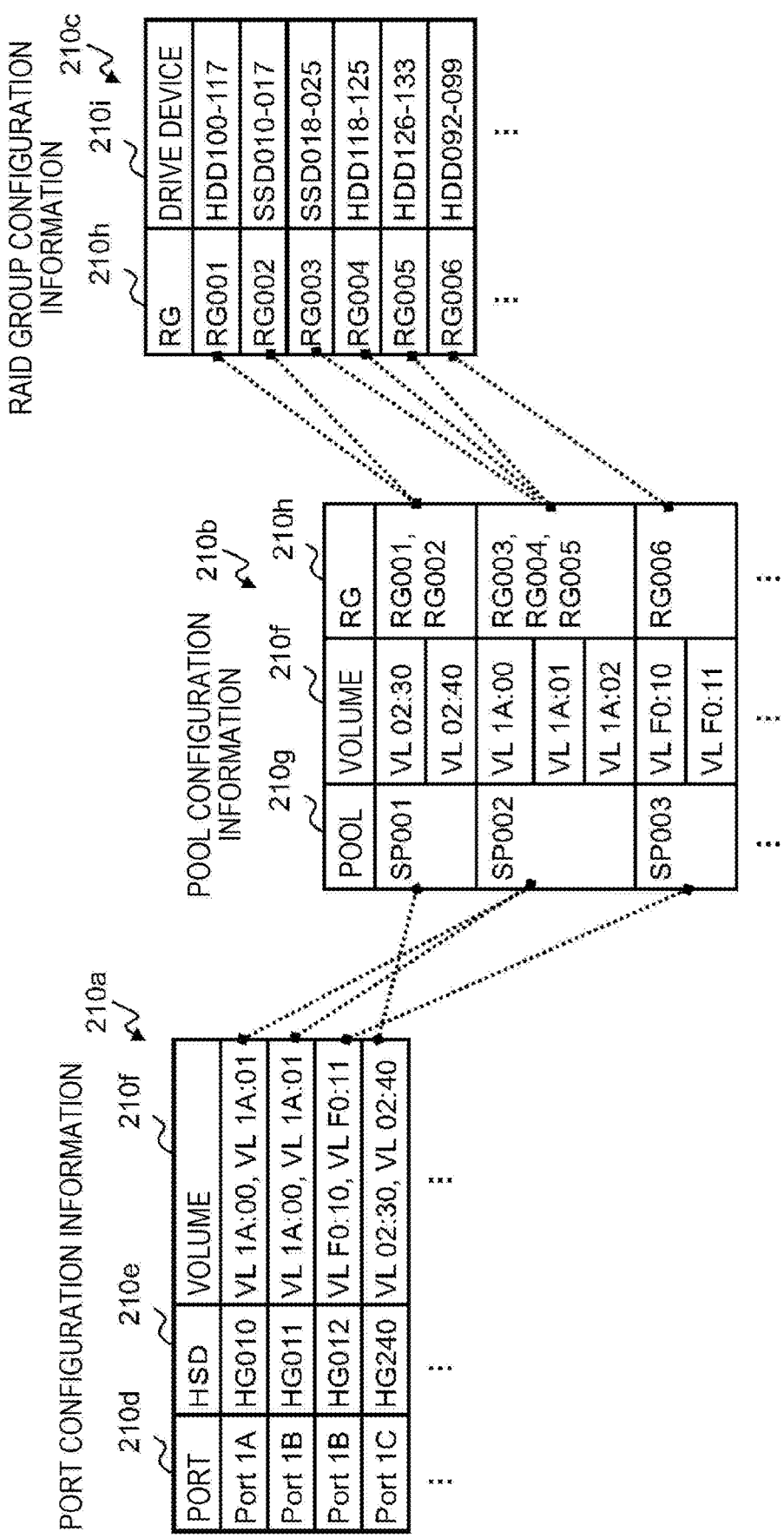
FIG. 4 is a diagram illustrating an example of storage configuration information.

FIG. 4 is a diagram illustrating an example of storage configuration information 210 managed by the storage configuration management program 204 and the storage configuration management database 205. The storage configuration information 210 illustrated in FIG. 4 is an example regarding some components (resources) of the storage device 100, and includes port configuration information 210a, pool configuration information 210b, and RAID group configuration information 210c.

There may be storage configuration information on resources such as the processor 151 and the cache 153, for example, as another storage configuration information. In the port configuration information 210a, information of an HSD column 210e representing LUN security and information of a volume column 210f representing the volume 101 are associated with information of a port column 210d representing the storage port 61.

In the pool configuration information 210b, the information of the volume column 210f representing the volume 101 and information of an RG column 210h representing the RAID group 104 are associated with information of a pool column 210g representing the storage pool 106.

In the RAID group configuration information 210c, information of a drive device column 210i representing the drive device 105 is associated with the information of the RG column 210h representing the RAID group 104. The information included in the storage configuration information 210 represents a unique name that does not overlap in resource types, and is a unique identifier within at least the single storage device 100.

Thus, as the identifier is traced, the storage configuration information 210 represents that, for example, the volume 101 of "VL 02:40" connected to the storage port 61 of "Port IC" is allocated from the storage pool 106 of "SP001" and there are the plurality of drive devices 105 belonging to the RAID group 104 of "RG001" and "RG002" constituting the storage pool 106.

Regarding the resources, the information managed by the storage configuration management program 204 also includes, for example, information such as an allocated capacity of the volume 101 and an execution state of the storage function, and resources thereof are identified using the identifiers as illustrated in FIG. 4 and managed as attribute values of the resources.

The attribute value may be referred to, for example, by a process of referring to another data structure holding an attribute value with an identifier as a main key, or by executing the storage configuration management program 204 to refer to configuration information of the storage device 100 in response to an inquiry by execution of another management program.

FIG. 5 is a diagram illustrating an example of the storage performance information 211 managed by the storage performance management program 202 and the storage performance history database 203. In the storage performance information 211, time-series numerical data (performance value) is stored for a resource ID 211b and a metric 211c. A time-series index is a time 211a, and the numerical data increases in a temporally later direction of the time 211a by being accumulated with a lapse of time.

The resource ID 211b is an identifier configured to identify the resource. FIG. 5 illustrates an example where the storage port 61 ("Port 0F"), the cache 153 ("Cache001"), the storage pool 106 ("SP102"), and the RAID group 104 ("RG030") are given as the resources.

Each resource has one or more metrics as illustrated in examples of a metric 211c-1 for the storage port 61, a metric 211c-2 for the cache 153, a metric 211c-3 for the storage pool 106, and a metric 211c-4 for the RAID group 104.

The metrics 211c differ depending on the type of the resource, and are common to the resources of the same type. In addition, when various storage functions operate, whether or not to execute a processing task may be included in the storage performance information 211, or an operating state may be digitized as, for example, binary values (1 during execution, 0 in a standby state, or the like) for ease of calculation.

Regarding the storage performance information 211, there may occur a case where a performance value different from an actual value is recorded due to failure of the storage performance management program 202 in addition to a case where there is a time zone in which a performance value is not recordable (set as a missing value) for some reasons or a time interval (sampling rate) at which a performance value can be obtained differs depending on the type of the resource.

These performance values may be removed, interpolated, or corrected in the pre-processing stage of analysis by a general technique. In addition, the amount of data of the performance values increases along with the lapse of time, and consumes a corresponding storage capacity in the management computer 200.

Thus, the performance value is deleted after a lapse of a preset preservation period, and is controlled by the storage performance management program 202 herein such that data of a period necessary for analysis processing to be described later can be saved and called.

FIG. 6 is a diagram illustrating an example of instance configuration information 212 managed by the instance configuration management program 206 and the instance configuration management database 207. FIG. 6 is an example of the three instances 11 for the sake of description, and illustrates information on each ID "A001", "A002", and "B330" with instance configuration information 212-1, instance configuration information 212-2, and instance configuration information 212-3.

The instance configuration information 212 includes setting values of a general category 212a, a server category 212b, a network category 212c, and a storage category 212d by classifying each detailed configuration information.

The general category 212a includes information, for example, a name given to the instance 11, an owner having full authority in the configuration change, a system name constituted by the plurality of applications 13 operated by the instance 11, and a type indicating whether the instance 11 is a physical server device, or a virtual machine or a container on the virtualization software 20.

For example, an IT system is generally constituted by the plurality of instances 11 in many cases even for providing single service, such as a Web three-tier application, redundancy of a database, and OS separation for each module.

The system name is given for the purpose of managing a group of the plurality of applications 13 and instances 11, and the instance configuration management program 206 has information for acquisition of a use situation of a workload operated by the user.

The server category 212b includes information on the server device 10 such as an identifier of the server device 10 being used, information on an allocated CPU, and a capacity of a memory (RAM).

If a type of the general category 212a is "physical", that is, a physical server device, it is difficult to change the allocation thereof. However, it is possible to change the allocation in a relatively flexible manner if the type is "virtual", that is, the instance 11 is a virtual machine or a container, and it is also possible to allocate (overcommit) a virtual number of CPUs or a virtual memory amount exceeding the mounting capacity of the server device 10 depending on a function of virtualization software 20.

The network category 212c includes, for example, information on a network interface of the instance 11. Although whether the network interface is a physical interface or a virtual interface differs depending on the type of the instance 11, the network category 212c includes information on network setting necessary for the instance 11 to provide the service via the network 50, such as an IP address, a network gateway, and a VLAN ID.

When the instance configuration information 212 is disclosed to the user, however, the setting of the network 50 set for the purpose of controlling the configuration of the server device 10 by the management computer 200 may be generally kept secret from the viewpoint of security.

The storage category 212d includes, for example, a disk ID for identifying a storage area, and a type and a capacity of the disk, and the like together with the information of the volume 101 serving as a creation source. As illustrated in FIG. 6, the storage area is not necessarily unique, and there may be a plurality of storage areas according to the requirement of the application 13 of the instance 11.

In addition, the instance 11 configured using a virtual machine and a container mainly uses the virtual disk 102 in the file format, but may use the volume 101 similarly to a physical server device according to requirement, and may hold a storage type separately from the general category 212a in order to clearly indicate the type.

As described above, the self-service in which the instance configuration information 212 is presented to the user to grant certain authority and delegate work such as the creation of the instance and the configuration change is the operation mode that has been generally carried out in the recent cloud system.

In addition, the configuration change is generally performed without manual intervention by an administrator in the cloud system, and thus, specific procedure and execution method of the configuration change work are automated by management software in many cases.

The automation management software thereof is closely cooperate with the instance management program group, but is not characteristic processing in the present embodiment and can be realized by general management software, and thus, the description thereof is omitted here. Meanwhile, details of each part related to such a management program, particularly the storage performance analysis program will be described later together with characteristic processing in the present embodiment.

As described above, the plurality of management computers 200 may be connected in response to the purpose such as load distribution. In particular, it is assumed that calculation performance required for the analysis program is relatively high, and thus, the load distribution by the plurality of management computers 200 is advantageous.

When dealing with such a requirement by parallelization or in-memory processing, a cluster management function for parallel calculation or a memory staging management function is required in addition to the management program. However, both the functions can be realized by a general processing framework, and are not characteristic functions in the present embodiment, and thus, the description thereof will be omitted.

<Configuration and Function of Analysis Program>

Figure 7:
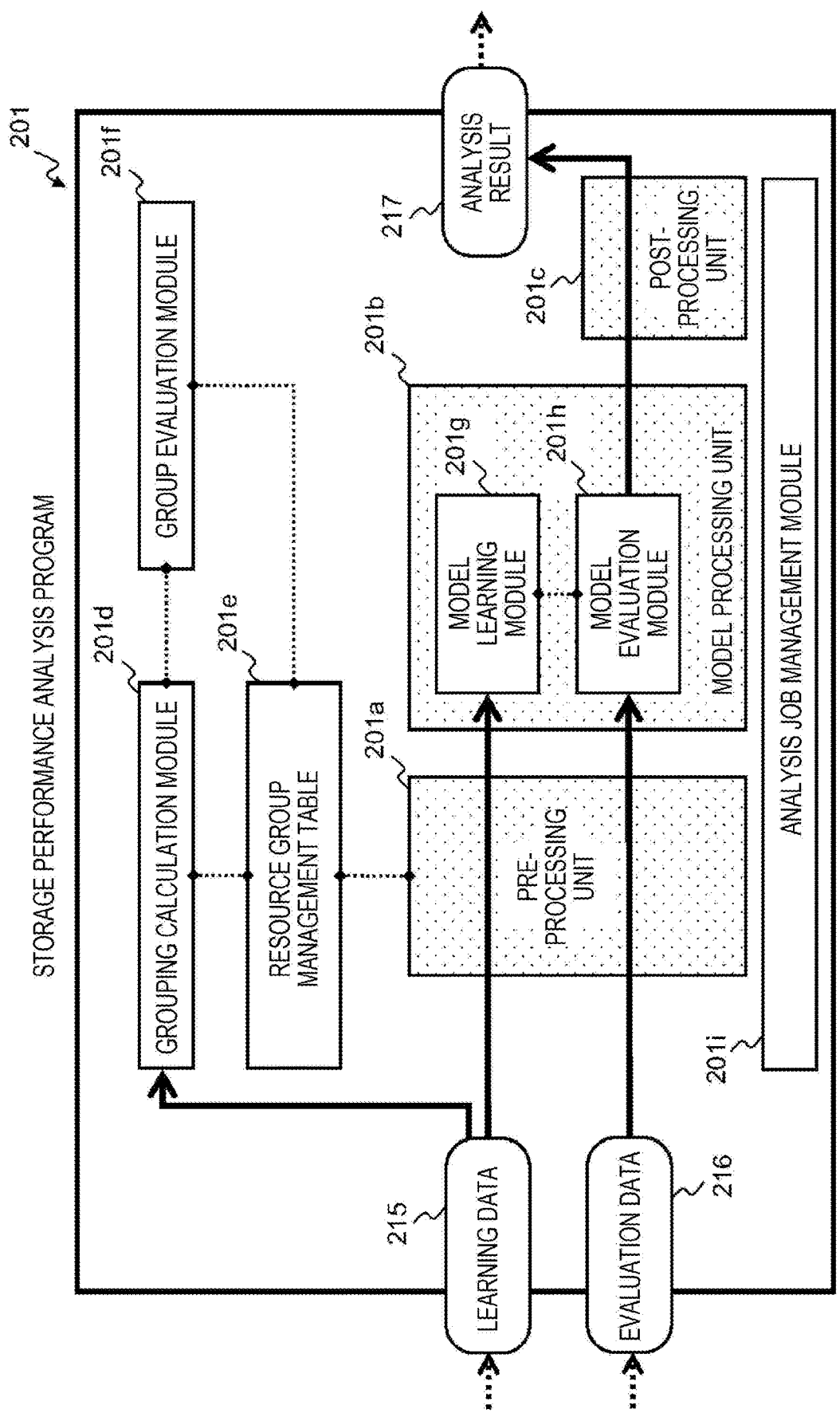
FIG. 7 is a diagram illustrating an example of a configuration of a storage performance analysis program.

FIG. 7 is a diagram illustrating an example of the configuration of the storage performance analysis program 201. The storage performance analysis program 201 mainly includes a pre-processing unit 201a, a model processing unit 201b, and a post-processing unit 201c to process data, and further, includes a grouping calculation module 201d, a resource group management table 201e, and a group evaluation module 201f to realize the characteristic functions in the present embodiment.

Further, the model processing unit 201b includes a model learning module 201g and a model evaluation module 201h to perform analysis by machine learning, and an execution procedure of each processing of the storage performance analysis program 201 is controlled by an analysis job management module 201i.

The storage performance analysis program 201 is configured to model the storage device 100 from the viewpoint of performance and detect a behavior different from a normal operation. In the computer system illustrated in FIG. 1, functions to be realized by the storage performance analysis program 201 are roughly classified into both learning and evaluation of performance data, and are realized mainly by the processing of the model learning module 201g and processing of the model evaluation module 201h, respectively.

The storage performance analysis program 201 is configured to create a mathematical model expressing the operating state of the storage device 100 from performance data (learning data 215) of the storage device 100 collected by the management computer 200 and managed by the storage performance management program 202.

Once the mathematical model is created, it is possible to determine whether subsequent performance data (evaluation data 216) deviates as compared with the time when the mathematical model has been created and to quantify the degree of deviation when there is the deviation.

Here, the process of creating the mathematical model from the performance data is referred to as learning, and the process of determining whether the storage device 100 is in a normal state using the mathematical model is referred to as evaluation. A series of data processing to detect an abnormal resource as knowledge (analysis result 217) if it is determined as abnormal in the evaluation including such processing relating to the mathematical model and processing (pre-processing and post-processing) required before and after the processing is collectively referred to as analysis.

In the example of FIG. 7, processing units responsible for the pre-processing, the mathematical model processing, and the post-processing are illustrated as the pre-processing unit 201a, the model processing unit 201b, and the post-processing unit 201c, respectively. In general, various types of mathematical models are known, and there are a plurality of execution methods and algorithms for learning and evaluation, but a representative example will be described herein in order to simplify the description.

However, characteristic analysis of the present embodiment, which will be described hereinafter, mainly relates to pre-processing of performance data, and the pre-processing is not limited to the representative example of the mathematical model to be described hereinafter and can be commonly applied regardless of the type of the mathematical model.

When performance data in which a plurality of workloads coexist is learned as a single mathematical model, there is a risk that it is difficult to determine an abnormal state from the composite mathematical model even if a behavior of a specific workload is abnormal. Therefore, it is desirable to specify a resource group related to each workload and to distinguish performance data to be learned in order to create a highly accurate mathematical model by learning.

In general, it is mathematically difficult to obtain a mathematical model with high statistical accuracy for a problem having many metrics (high-order multi-variable problem), and thus, it is possible to say that accuracy of an evaluation result depends on selection and analysis of performance data which truly characterizes the behavior.

There is also a method of calculating the relation between resources based on information on the configuration of the storage device 100, but it is difficult for the storage configuration management program 204 to calculate the relation between resources for each workload because the storage configuration management database 205 does not hold information on the relation between the instance 11 or the application 13 and the resource of the storage device 100 which is the object of the present embodiment.

Even if the storage configuration management program 204 and the instance configuration management program 206 are linked in a certain method to obtain association therebetween, a creation situation and a use situation of the instance 11 dynamically change depending on the usage of the user, and thus, it is difficult to consider that a calculation result reflecting an actual operating state can be obtained at the time when the calculation of relation is ended.

As another method, there is also a method of statistically using a technique such as principal component analysis (PCA) to extract a conspicuous metric (having a large variance) from among the metrics and reducing the dimension of the problem (here, corresponds to the number of metrics).

However, the work of extracting the metric differs depending on a technique to be used, and inevitably depends on the subjectivity such as experience and prerequisite knowledge of an analyst obtained through trial and error. As a result, there is a possibility of rejecting a metric derived from an influential workload depending on a time zone when target performance data is acquired.

Further, there is a disadvantage that an extracted result becomes a composite number of metrics such as a weighted average and deviates from the physical meaning originally held by the metrics according to a method particularly involving conversion such as PCA.

Therefore, in the present embodiment, resources are classified into a plurality of groups based on a level of a correlation coefficient between resources, and the problem is divided into partial problems by summarizing performance data of resources belonging to the same group. The resource herein is a physical or logical constituent element in the storage device 100, and resources that are in a connected relationship and are used by the same workload show a similar (highly correlated) behavior with respect to a time axis regardless of the hierarchy in the physical sense.

A group of resources having a high correlation or a combination of metrics thereof will be referred to as a resource group herein for the sake of convenience, and dividing (classifying) the performance data and the mathematical model based on the resource group will be referred to as grouping.

Incidentally, metrics derived from the same resource are obviously highly correlated with each other among the metrics, and thus, may be classified into the same resource group. Further, the same resource may be counted in a plurality of resource groups in an overlapping manner depending on a method of calculating a resource group based on the correlation coefficient, and redundant data may be held when dividing (classifying) the performance data.

In addition, a resource having a correlation, lower than a preset threshold, with any resource and is not substantially used with a use frequency less than a preset threshold may be classified into another group by providing the other group indicating that the resource belongs to the other group.

The grouping calculation module 201d is configured to calculate a resource group using a correlation of each resource, and stores a calculation result in the resource group management table 201e such that the calculation result can be referred to by the pre-processing unit 201a. The pre-processing unit 201a is configured to divide (classify) the performance data (the learning data 215 and the evaluation data 216) according to the calculation result of the grouping calculation module 201d.

The pre-processing unit 201a refers to the resource group management table 201e to select a series of resources and metrics from performance data and create partial data for a set of resources calculated as the same group by the grouping calculation module 201d. The group evaluation module 201f and the post-processing unit 201c will be described later.

FIG. 8 is a diagram illustrating an example of the resource group management table 201e, which is information on the resource group calculated by the grouping calculation module 201d. The resource group is a set of highly correlated resources or metrics.

In the resource group management table 201e, a resource identifier (resource ID column 201e-2) and a metric (metric column 201e-3) are held for a resource group identifier (group ID column 201e-1).

In order to simplify the description, it is assumed that the resource identifier held in the resource ID column 201e-2 is the same as the identifier of the storage configuration information 210 handled by the storage configuration management program 204. However, different identifiers may be used as long as the identifiers can be associated with each other by a mechanism of a name directory.

Similarly, the metrics held in the metric column 201e-3 are basically the same as the metrics of the storage performance information 211 handled by the storage performance management program 202.

In addition, a task representing the storage function being operated may be counted as a type of a resource if a state can be observed, and "Copy Task 26" in the last line of the resource group management table 201e is an example of holding a task to operate the copy function as a resource. As described above, the resource that can be held herein is not limited to one with which performance data is provided by the storage performance management program 202.

The resource group identifier (group ID column 201e-1) is a so-called label indicating a set of resources, and it is important to hold which resource and which resource are classified into the same group rather than the identifier being constant with a lapse of time. Therefore, the resource group identifier is commutative for one calculated from the same learning data 215.

The group evaluation module 201f records a plurality of generations of resource groups with a lapse of time (for example, periodically) and compares the generations. If there is a configuration change of a resource in the storage device 100 or if there is significant creation or deletion of the application 13, the resource group changes in response thereto, and the accuracy of analysis deteriorates as the mathematical model deviates from the behavior of the storage device 100.

Thus, if there is a conspicuous difference exceeding a preset threshold by comparing the plurality of generations, there is a possibility that it is possible to improve the accuracy of analysis by considering that there is a large change in the computer system and re-creating the mathematical model. Therefore, when it is detected by the group evaluation module 201f that there is a change exceeding the preset threshold in an output value of the grouping calculation module 201d, the re-calculation of the mathematical model may be performed.

Since the resource group is calculated mainly using the performance data as will be described later, it is possible to detect the configuration change of the system without analyzing the storage configuration information 210 in detail and allow the mathematical model to follow the actual state of the system.

In the model processing unit 201b, the model learning module 201g learns the mathematical model from the learning data 215, and the model evaluation module 201h performs evaluation for the performance data (evaluation data 216).

Although the same mathematical model is used by the model learning module 201g and the model evaluation module 201h, a plurality of mathematical models are created (learned) for each subset of the learning data 215 grouped and divided in the pre-processing unit 201a. Since learning and evaluation of each mathematical model can be executed independently for each subset, it is possible to expect an effect of shortening the entire processing time by executing the learning and evaluation in parallel.

The learning of the mathematical model by the model learning module 201g and the evaluation by the model evaluation module 201h using the mathematical model are algorithms to perform so-called abnormality detection and a general analytical technique can be applied thereto.

As such algorithms, one that uses a support vector machine (SVM) and various types of cluster analysis is known. Here, a description will be given regarding processing using the k-means method, which is one of unsupervised machine learning assuming that a data set is not obtainable, as an example.

First, the learning data 215 is used as data representing the normal state of the storage device 100, and the pre-processing unit 201a performs the above-described grouping, scaling, or the like. In the model learning module 201g, clustering by the k-means method is performed by considering the learning data 215 that has undergone pre-processing as a set on a multi-dimensional space with each metric as an axis.

Here, the learning data 215 is a time-series performance value in the normal state of each resource of the storage device 100, and is divided into a plurality of clusters reflecting a characteristic of a workload or a utilization degree depending on a time zone.

Since these clusters represent behaviors of the storage device 100 in the normal state, for example, a distance from a cluster center (Mahalanobis distance when scaled) is a quantitative index indicating an abnormality of a state, and is referred to as an abnormality degree.

Therefore, such a mathematical model based on clustering is formulated as a standard deviation representing the cluster center and a cluster size obtained by the k-means method defined in the multi-dimensional space divided for each resource group. The model evaluation module 201*h* calculates a distance from the closest cluster center to the evaluation data 216 and calculates an abnormality degree.

The pre-processing unit 201*a* is configured to process the learning data 215 and the evaluation data 216 to be a format suitable for processing performed by the model processing unit 201*b*. The pre-processing unit 201*a* may combine general pre-processing performed in the field of data analysis and pre-processing peculiar to this computer system as necessary.

The pre-processing is basically processing which is common with respect to both the learning data 215 and the evaluation data 216, but detailed setting (for example, setting such as interpolation processing of a missing value) is not necessarily common. The general pre-processing is, for example, processing of scaling which includes processing configured to cope with a missing value, an incorrect value, or an outlier that is likely to be included in the storage performance information 211 and normalization to handle metrics in different units.

The pre-processing peculiar to this computer system includes the association with the resource ID and the metric ID and the grouping of dividing (classifying) the performance data (evaluation data 216) according to the definition of the resource group (information of the resource group management table 201*e*).

The post-processing unit 201*c* is configured to further process the evaluation result of the mathematical model to be shaped as an analysis result. For example, the post-processing unit 201*c* determines whether the abnormality degree is within an allowable range based on a preset threshold, and outputs the analysis results 217 to another management program of the management computer 200 together with additional information such as metric estimated to be a factor or enables the analysis result 217 to be displayed to the administrator.

The threshold (positive value) used for determination of the abnormality degree may be, for example, twice the standard deviation from the concept of the percentile assuming that the performance data follows the normal distribution. In the modeling by the k-means method, the abnormality degree is simply an index that presents whether there is a behavior different from the normal state in the target multi-dimensional space, and does not include information on which metric is a factor.

When the abnormality degree is high and a tendency of being determined as a problem in terms of performance is detected, it is desirable to separately execute a process of estimating a metric that may be a factor by the post-processing unit 201*c*. Most conveniently, the post-processing unit 201*c* may enumerate a plurality of components (metrics) in order from the component having a large distance from the cluster center.

The above execution of processing according to each processing unit and each module in the storage performance analysis program 201 is controlled by the processing of the analysis job management module 201*i*. For example, the analysis job management module 201*i* is configured to cause the pre-processing unit 201*a*, the model processing unit 201*b*, and the post-processing unit 201*c* to be sequentially executed in response to an input of the evaluation data 216.

In addition, the processing of the analysis job management module 201*i* may perform calculation of the resource group and learning of the mathematical model based on the learning data 215 if necessary (by determining some preset conditions) to continuously improve the accuracy of the analysis processing.

When each procedure is executed in the storage performance analysis program 201, the processing of the analysis job management module 201*i* not only obtains approval beforehand from the administrator who performs the analysis but also causes each procedure to be executed periodically according to the frequency defined beforehand. Alternatively, another processing may be started in accordance with a processing result of each part such as the group evaluation module 201*f*.

Figure 9:
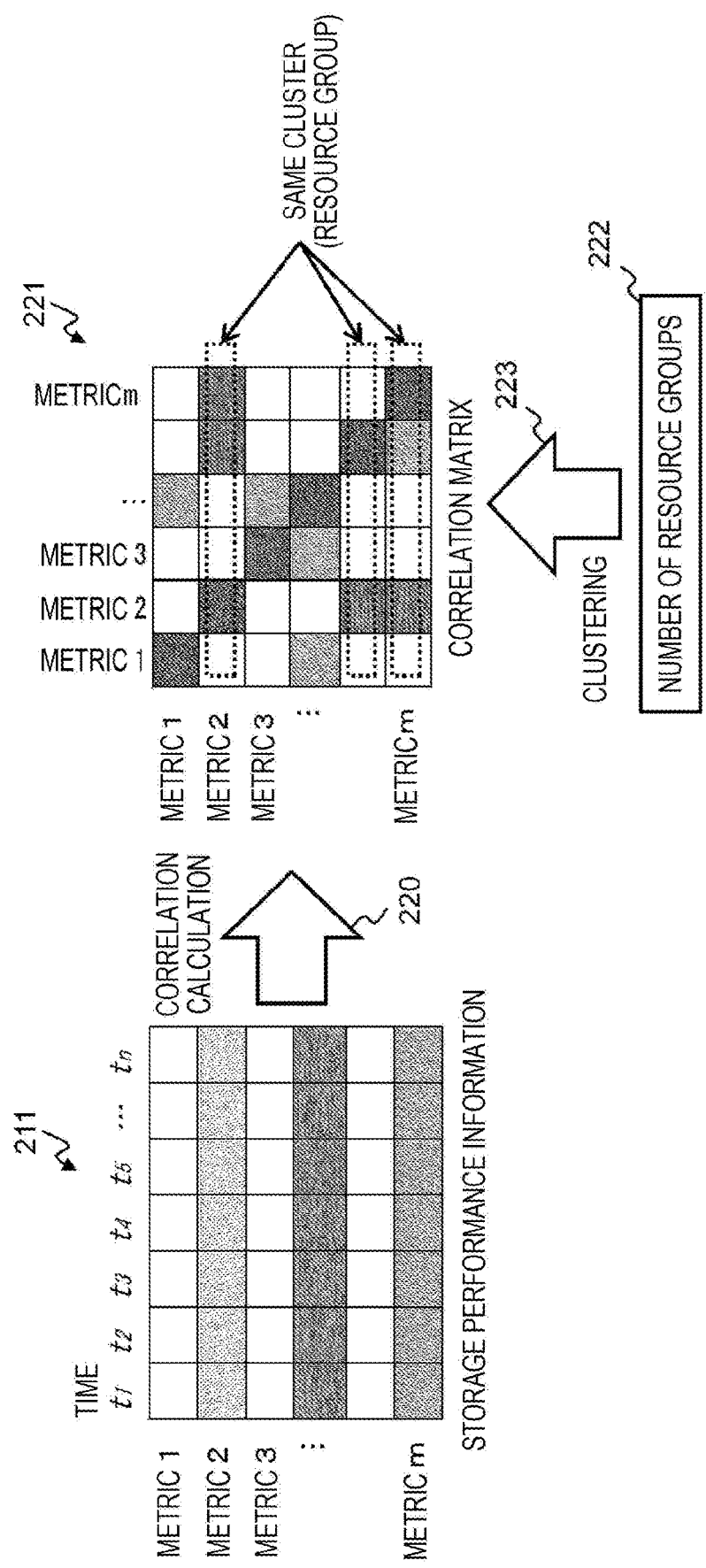
FIG. 9 is a diagram illustrating an example of calculation of a resource group.

FIG. 9 is a diagram illustrating an example of calculation of a resource group. The grouping calculation module 201*d* calculates a resource group based on a correlation matrix calculated for metrics for each resource.

When a correlation is calculated (correlation calculation 220) using the learning data 215 obtained from the storage performance management program 202 as the time-series data (storage performance information 211) for each metric, a correlation matrix 221 having the total number of target metrics as the order is obtained.

If two metrics are paired, the correlation herein is a quantity that becomes higher when a value of one metric changes in proportion to (positive correlation) or changes in inverse-proportion to (negative correlation) a temporal change of the other metric, and becomes lower when the value changes are not synchronized.

The correlation matrix 221 is generally a symmetric matrix, and clustering 223 is performed with a predetermined number 222 of resource groups by considering a row or column direction thereof as a new vector to classify metrics having a high correlation into the same group (cluster).

In this manner, a set of resources belonging to a group or a set of metrics affiliated to resource is defined as a resource group. The calculated resource group is expressed in a format like the resource group management table 201*e* illustrated in FIG. 8.

When a plurality of the storage devices 100 are connected in the computer system illustrated in FIG. 1, identifiers of the storage devices 100 may be separately combined or the resources ID may be assigned so as to be unique across the plurality of storage devices 100.

As in the storage performance information 211 illustrated in FIG. 5, a resource has a plurality of metrics. Although a resource group may be calculated for a plurality of metrics of each resource, one metric which is representative (representative metric) may be selected and a correlation matrix may be calculated since it is considered that a plurality of metrics of the same resource naturally have a high correlation.

It is assumed that how to select the representative metric is common at least for the same resource type. For example, when assuming that a representative metric of a certain storage port A is IOPS, representative metrics of the other storage ports B and so on are set to IOPS.

When calculation is performed using a plurality of metrics for one resource, there is a possibility that a single resource is selected in an overlapping manner in different resource groups (metrics of the same resource are clustered into different groups).

On the other hand, when a correlation is calculated using one metric for each resource as the representative metric, resources are grouped without overlapping. However, when the representative metric is used, it is assumed that all the metrics belonging to the same resource belong to the same resource group.

Since the number of dimensions of data used for learning of the mathematical model is related to the accuracy of the mathematical model 222, it is desirable to appropriately set the number 222 of resource groups in accordance with the configuration of the computer system. Initially, the characteristic of the workload is taken into account in the basic approach of the present embodiment.

From this approach, there is a high possibility that it is appropriate to set the number 222 of resource groups using the number of workloads for which users and uses are independently set (the number of applications 13 or the number of systems constituted by a plurality of applications).

However, as described above, the storage device 100 has a smaller number of and shared structures such as the storage port 61, and the workload using the storage device 100 is not independent since there is mutual influence in the shared structure.

Further, the information of the application 13 is managed outside the storage management program group like the instance configuration management program 206, and it is difficult for the storage performance analysis program 201 to determine an influence range of the workload. Therefore, in the present embodiment, the number 222 of resource groups is set by using the minimum number of resource elements when each part in the storage device 100 is divided into a plurality of resource hierarchies.

Figure 10:
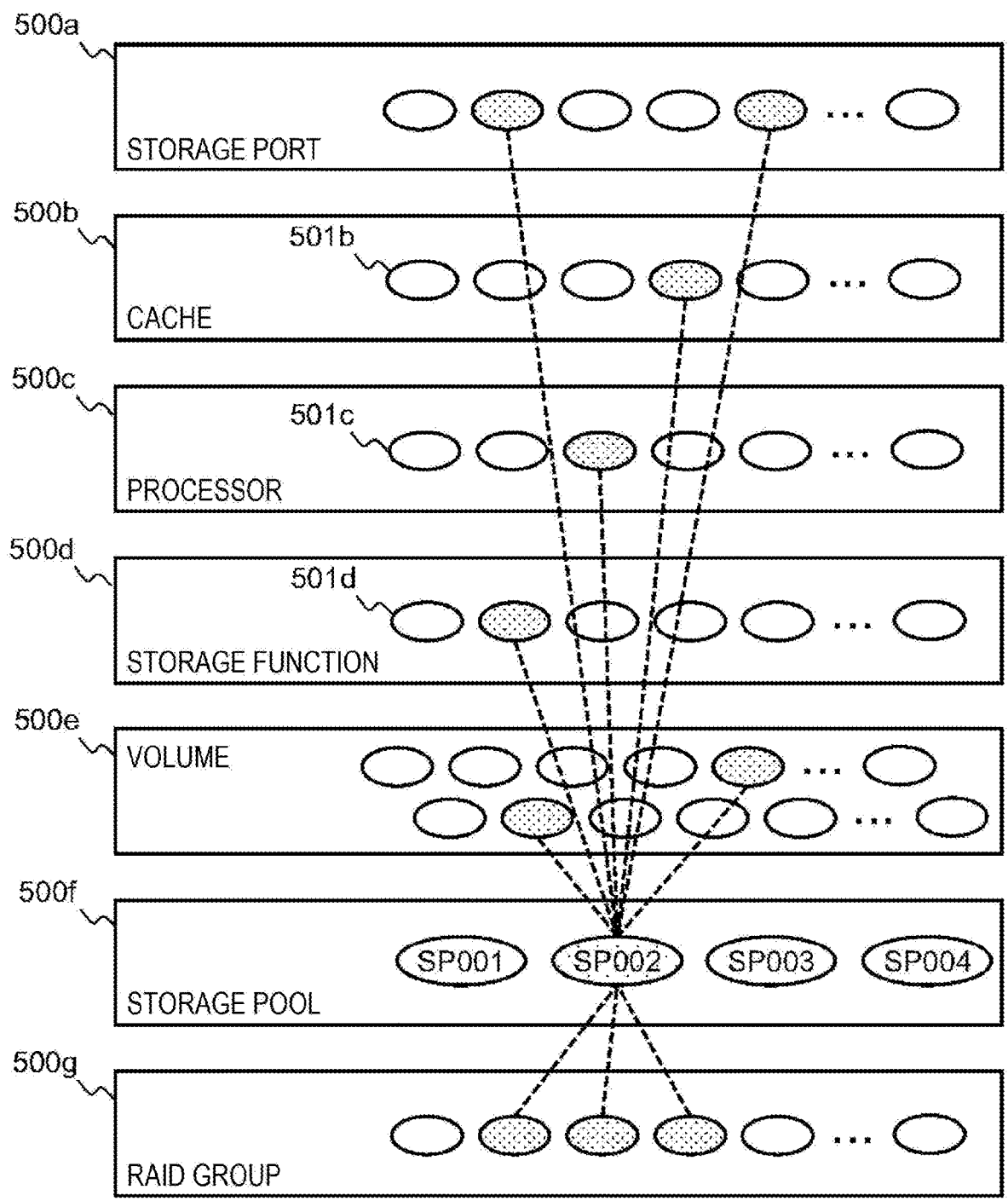
FIG. 10 is a diagram illustrating an example of a resource hierarchy and a resource group.

FIG. 10 is a diagram illustrating an example of a resource hierarchy and a resource group. As illustrated in FIG. 10, the respective resources constituting the storage device 100 are connected not arbitrarily but hierarchically.

The storage device 100 includes a storage port layer 500a including the respective storage ports 61, a cache layer 500b including respective allocation areas 501b of the cache 153, a processor layer 500c including cores 501c of the respective processors 151, and a storage function layer 500d including storage function execution processes 501d.

Further, the storage device 100 includes each layer of a volume layer 500e including the respective volumes 101, a storage pool layer 500f including the respective storage pools 106, and a RAID group layer 500g including the respective RAID groups 104.

Therefore, if a correlation between resources is investigated, a correlation between resources in upper and lower hierarchies is higher than a correlation between different resources in the same hierarchy. Here, the minimum number of resources will be referred to as nodes in the sense that the resources are highly correlated with the element of each resource hierarchy and are fewer and dominate over all the target resources.

A more practical example of the node is the storage pool 106 according to the present embodiment. The storage pool 106 is located between the volume 101 and the RAID group 104, and is a structure that aggregates input/output processing, and further, the media allocation of the drive device 105 is managed by the storage pool 106.

Alternatively, in the present embodiment, it is possible to say that the storage pool 106 is a structure related to the usage of the system by the user to some extent since there is a case of performing an operation of allocating the storage pool 106 as the unit for building a system for a certain application such as a tenant environment, a production environment, and a test environment.

Even in terms of experiments, resources with a high correlation are selected from each hierarchy to constitute one resource group, for example, when investigating a correlation with respect to a specific storage pool "SP002" as illustrated in FIG. 10.

In the present embodiment, it is assumed that the highly correlated resources are operating under the influence of a specific workload as described above. The node may be used as the basis to set the number of resource groups, and further, the setting based on the knowledge concerning the operation of the storage device 100 or the computer system may be used to set the number of resource groups, for example, by adding the number of simultaneous operation tasks of the storage function to the number of nodes.

As described above, a resource group to classify a resource having a low correlation with any other resource may be provided, and the number of resource groups provided in this manner may be added to the number of resource groups obtained based on the node. In addition, as long as a resource hierarchy that aggregates the behavior of the target is selected, a resource hierarchy that serves as an exceptional node may be selected by the analyst.

For example, if the analyst selects the storage pool 106 considering that the storage pool 106 is dominant in the environment (storage device 100) in which the number of the processors 151 smaller than the number of storage pools 106 are mounted, the number of resource groups may be set based on the storage pool 106 from such selection.

More specifically, in an application in which, for example, the storage function that consumes a large amount of processing capacity of the processor 151 is hardly used and data changes occur over a wide range of storage areas, the storage pool 106 is a resource hierarchy that determines the behavior of the storage device 100 rather than the processor 151.

Meanwhile, a resource hierarchy that is rarely shared and does not aggregate workloads, or a constituent element in a resource that is not related to other resource hierarchies is inappropriate as the node. Specifically, for example, the volume 101 is rarely shared by a plurality of workloads, and the number of circuit boards of the cache 153, which are physically mounted, is not directly related to other logical resources, and thus, the both are inappropriate as the node.

A resource hierarchy and a resource identifier of a resource included in the resource hierarchy are acquired by the storage configuration management program 204. For this purpose, the storage configuration management program 204 may investigate the interface (API) generally provided to cooperate with the management program to acquire a resource type or name which is external specification.

<Processing Flow of Analysis Program>

Figure 11:
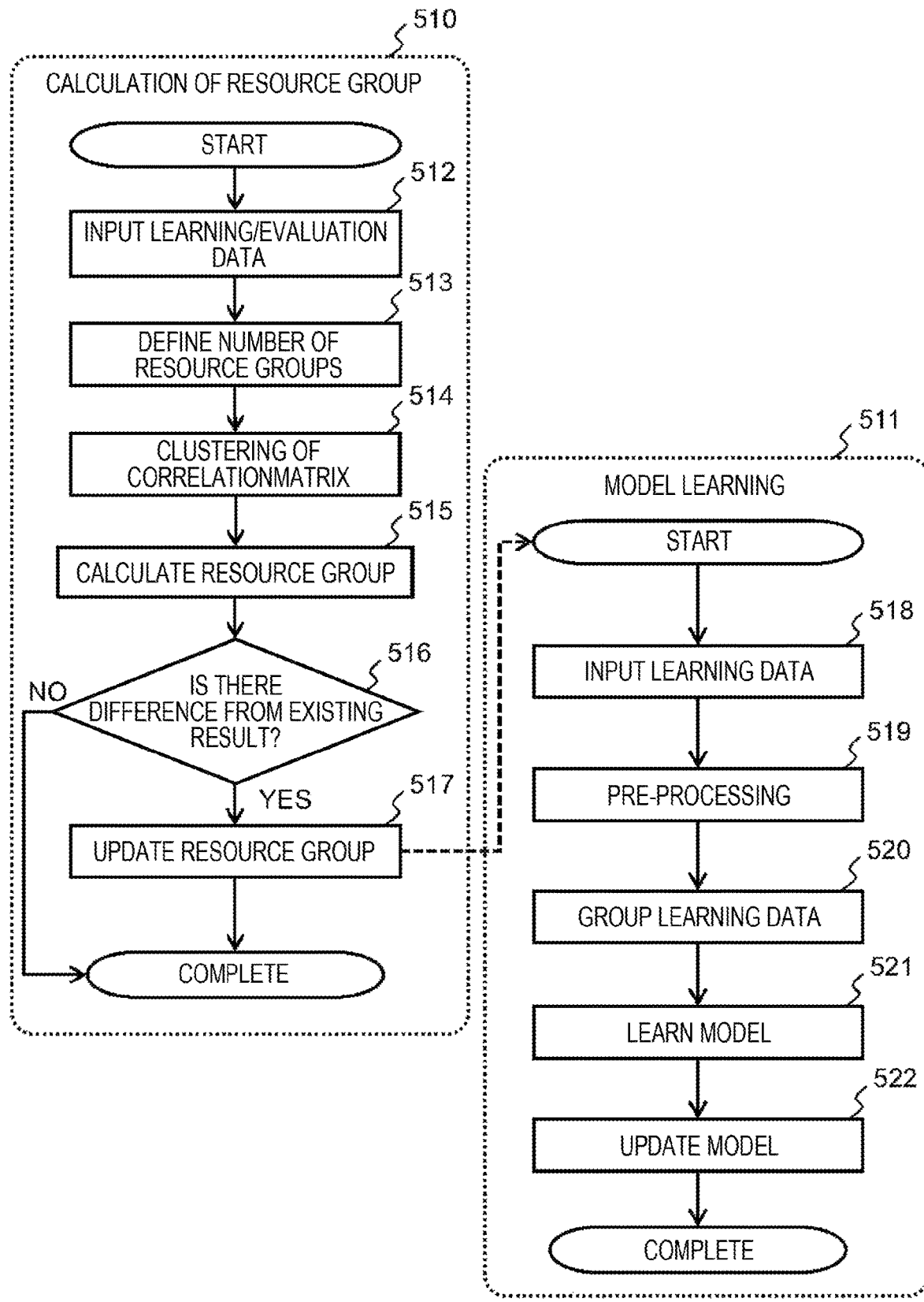
FIG. 11 is a diagram illustrating an example of processing flow of resource group calculation and model learning.

FIG. 11 is a diagram illustrating an example of processing flow 510 of calculation of a resource group and processing flow 511 of model learning of the learning data 215. The processing flow 510 and the processing flow 511 are not necessarily executed in a synchronous manner, but the resource group created by executing the processing flow 510 is used in the processing flow 511.

In the processing flow 510, a resource group is calculated from performance data input by the storage performance analysis program 201. Examples of a trigger that starts the processing flow 510 include an instruction from the analyst, regular startup according to the frequency of the configuration change of the computer system, detection of arrival of the learning data 215 or the evaluation data 216, and the like. However, the execution control of the processing flow 510 is performed by the analysis job management module 201i.

In step 512, the grouping calculation module 201d inputs the performance data. The same pre-processing as the pre-processing performed by the pre-processing unit 201a, such as processing of missing values and scaling, may be applied to the input performance data.

In step 513, the grouping calculation module 201d sets the number of resource groups. Regarding the number of resource groups, when the nodes are statically given, the number of nodes set beforehand may be defined directly as the number of resource groups.

In addition, when the number of resource groups dynamically changes, the number of nodes may be acquired as information of the storage configuration information 210 by the execution of the storage configuration management program 204, and the acquired number of nodes may be defined as the number of resource groups. Here, the information given by the execution of the storage configuration management program 204 is the number of nodes and does not necessarily include the other information of the storage configuration information 210.

In step 514, the grouping calculation module 201d extracts time-series metrics from the input performance data and calculates a correlation matrix from the extracted metrics. Further, the calculated correlation matrix is clustered by the number of resource groups defined in step 513.

In step 515, the grouping calculation module 201d calculates each cluster of resources or metrics obtained by clustering as a resource group. Here, when a representative metric is used, the information on the resource group is corrected as a metric other than the representative metric included in the same resource is also regarded to be included in the same resource group as the representative metric.

In step 516, the group evaluation module 201f acquires the calculation result of the resource group from the grouping calculation module 201d, compares the calculated result with a resource group calculated in the past, and completes the process of the processing flow 510 when determining that there is no difference exceeding a preset threshold.

In step 516, when the group evaluation module 201f determines that there is a difference exceeding the preset threshold, the process proceeds to step 517. Incidentally, in a case where there is no resource group calculated in the past, that is, in the case of execution of the storage performance analysis program 201 immediately after being initialized, the process proceeds to step 517 without performing the comparison in step 516.

In step 517, the grouping calculation module 201d or the group evaluation module 201f updates the resource group management table 201e using the calculation result of the resource group.

Since a change in accuracy of the mathematical model is expected when step 517 is executed and the resource group is updated, the processing flow 511 may be started so as to create a mathematical model again if step 517 is executed.

Alternatively, examples of a trigger that starts the model learning processing flow 511 to create the mathematical model from the learning data 215 may include an instruction from the analyst, regular startup according to the frequency of the configuration change of the system, detection of arrival of the learning data 215, and the like. However, the execution control of the processing flow 511 is performed by the analysis job management module 201i.

In step 518, the storage performance management program 202 acquires the learning data 215 corresponding to a preset length. As a result, the performance data corresponding to a sufficient length for creation of the mathematical model is secured.

In step 519, the pre-processing unit 201a applies pre-processing to the learning data 215. The pre-processing herein may include not only processing peculiar to the learning data 215 as well as general pre-processing in the field of data analysis such as processing of missing values, processing of incorrect values, and scaling including normalization.

In step 520, the pre-processing unit 201a divides the learning data 215 according to the definition of the resource group held in the resource group management table 201e. The learning data 215 is divided into partial data, and a procedure of model learning is executed in parallel for each partial data.

In step 521, the model learning module 201g of the model processing unit 201b creates a mathematical model for each partial data. When the model learning is executed in parallel for each partial data, it is unnecessary for model learning to wait for completion of creation of another mathematical model since the pieces of partial data are independent from each other.

In step 522, the model learning module 201g updates the model definition to be shared with the model evaluation module 201h. The mathematical model in the present embodiment is the standard deviation of the cluster center or the cluster on the multi-dimensional space configured based on the definition of the resource group. There may be setting of a condition under which the update of the mathematical model is omitted.

Figure 12:
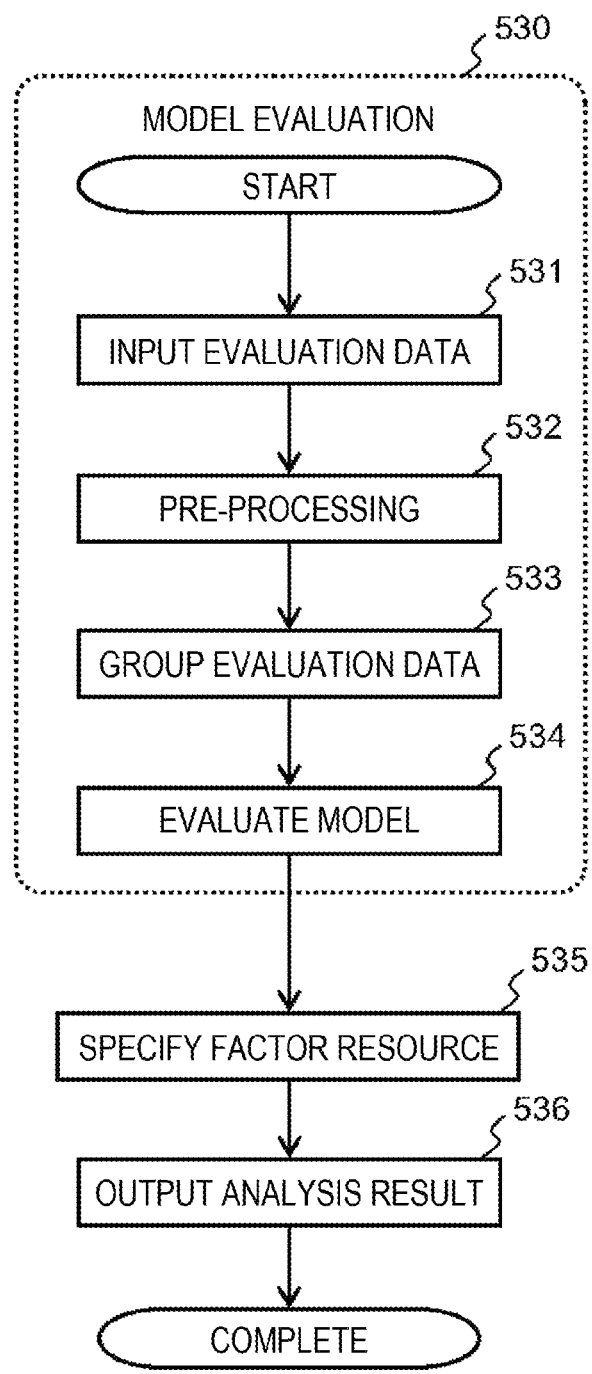
FIG. 12 is a diagram illustrating an example of processing flow of model evaluation.

FIG. 12 is a diagram illustrating an example of processing flow of model evaluation of the evaluation data 216. The processing flow illustrated in FIG. 12 includes model evaluation processing flow 530 configured to calculate the abnormality degree of the evaluation data 216 and post-processing thereof.

Examples of a trigger that starts the model evaluation processing flow 530 include an instruction from the analyst, regular startup according to the frequency of the configuration change of the system, detection of arrival of the evaluation data 216, and the like. However, the execution control of the processing flow 530 and the post-processing is performed by the analysis job management module 201i.

In step 531, the storage performance management program 202 inputs the evaluation data 216. A length of the evaluation data 216 depends on a requirement of a mathematical model and a requirement of an analyte to be expected. More specifically, for example, when the mathematical model requires an average of a plurality of points or a difference in time series, a certain length of evaluation data is required. This length may be set in advance.

In step 532, the pre-processing unit 201a applies pre-processing to the evaluation data 216. The pre-processing herein is the same as the pre-processing in step 519 during the above-described learning. In step 533, the pre-processing unit 201a divides the evaluation data 216 into partial data according to a definition of the resource group held in the resource group management table 201e.

The definition of the resource group for this division is the same as that in the model learning. If the definition of the resource group is updated during the evaluation, the analysis job management module 201i stops the evaluation processing flow 530. When the division is completed, the subsequent model evaluation procedure is executed in parallel for each partial data.

In step 534, the model evaluation module 201h of the model processing unit 201b evaluates an abnormality degree for each partial data. The mathematical model used herein is the same as that in the model learning. If the definition of the mathematical model is updated during the evaluation, the analysis job management module 201i stops step 534.

In step 535, the post-processing unit 201c specifies a resource that serves as a factor of increasing the abnormality degree. Step 535 is omitted (skipped) when it is unnecessary to specify the resource (and metric) serving as the factor in terms of the requirement of the analysis. The necessity in terms of the requirement of analysis may be set in advance.

In addition, step 535 may be omitted even when it can be determined that the abnormality degree is small and it is the normal operating state with respect to the performance data input as the evaluation data 216, for example, even when the abnormality degree is determined to be small by comparing the abnormality degree with the preset threshold.

In step 536, the post-processing unit 201c outputs the analysis result 217 of the analysis processing. If it is necessary for cooperation with another management program, the post-processing unit 201c may enumerate the abnormality degree of each resource group and identified factors thereof as the analysis results 217 and shape the analysis results 217 into a specific data structure, and may shape the analysis results 217 into a format for presentation to the user in the case of presenting the analysis results 217 to the user.

According to the present embodiment, an analytical technique of efficiently analyzing resource performance in consideration of the relation with the workload is provided in the storage device 100 shared as the memory device in the computer system. Since various workloads mixedly exist and pieces of performance data also mixedly exist, it is possible to extract a valid component for each workload to perform modeling even when it is difficult to model a conspicuous behavior.

Even when it is difficult to obtain strict and complete configuration information of a target system, highly accurate analysis becomes possible by calculating the resource group based on the correlation between pieces of performance data. Since model learning and evaluation can be performed independently for each partial data, it is possible to perform the analysis processing in parallel and shorten the time required for the analysis processing.

Although the example of analyzing the performance information has been described with the object of the storage device 100 in the present embodiment, the analysis provided by the present embodiment can be easily expanded to other objects. For example, the present embodiment can be expended to have not only the storage device 100 but also the server device 10, a network switch 550, a power supply device 551, and a facility such as air conditioning equipment (not illustrated) as the analysis object when a data center is set as an object as illustrated in FIG. 13.

Figure 13:
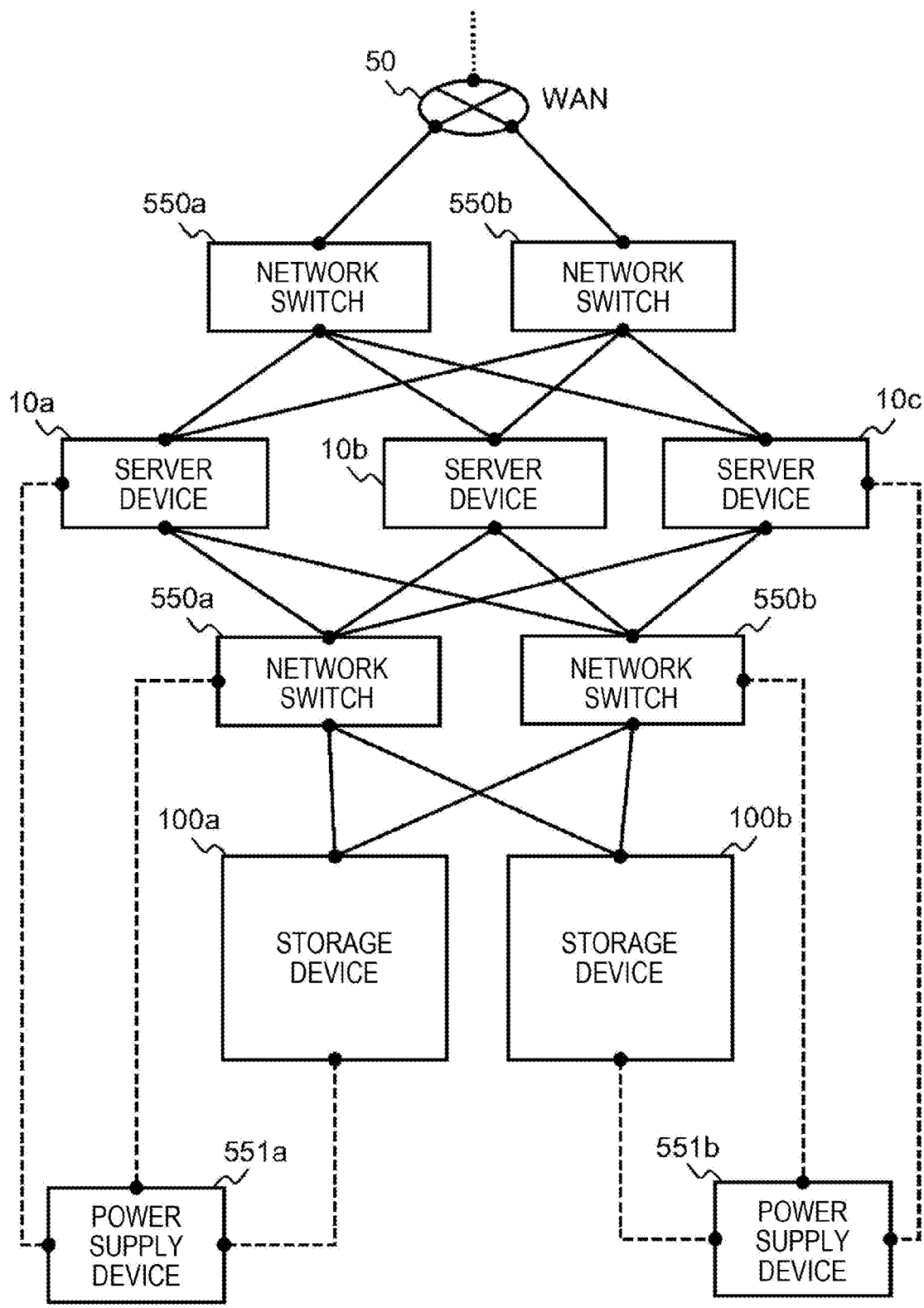
FIG. 13 is a diagram illustrating an example of a data center.

In the example illustrated in FIG. 13, for example, a resource hierarchy may be defined such that devices having the same type are classified into the same hierarchy, and a resource group may be defined by setting the network switch 550 or a VLAN ID as a node.

Further, when the data center illustrated in FIG. 13 is combined with a network virtualization technique or a storage virtualization technique, a resource group may be defined by setting a controller appliance as a node, and the analysis described in the present embodiment may be applied using such a defined resource group.

For example, as illustrated in FIG. 14, in an implementation example of a distributed software storage environment, a distributed storage controller 560 operates as a kind of virtual machine in the form where virtual machine instances 11c and 11d coexist in server devices 10c and 10d or in the form of occupying a server device 10e, and drive devices built in the server devices 10c to 10e are provided as volumes 561 that can be shared to nodes (not illustrated) connected to a LAN 50.

In the case illustrated in FIG. 14, a storage area is provided by cooperation of the plurality of server devices 10, and a storage destination of data is dynamically changed. However, it is possible to perform modeling reflecting characteristics of workloads, for example, by defining a resource group with the distributed storage controller 560 as a node and applying the analysis described in the present embodiment.

In general, a large number of hardware and software from different providers are mixed in the data center, and thus, a management system and a logical configuration are not uniform so that it is difficult to obtain detailed configuration information of a system in the data center. Even in such a case, the resource group can be defined and analyzed as in the present embodiment.

As described above, it becomes possible to convert the analysis of a large-scale performance data having a large number of dimensions to a plurality of partial problems having a smaller number of dimensions, and thus, the accuracy of modeling can be improved. In addition, it is possible to efficiently utilize the resources of the management computer to execute the analysis processing by localizing the data to be used, and it is possible to shorten the time required for obtaining a solution by performing the analysis processing in parallel.

Further, the highly accurate modeling is possible even when the configuration information is insufficient or incorrect and when it is difficult to obtain the latest configuration information since the complete configuration information is not required. It is also possible to estimate a change in the resource configuration or a change in the workload by detecting a change of a combination of highly correlated items.

What is claimed is:

1. A method for analyzing the performance of a computer system using a management computer, wherein the computer system includes a plurality of resources, the method comprising:
providing a management computer including a processor and a memory device in which a program to be executed by the processor is stored,
utilizing the processor to divide the plurality of resources of the computer system into a plurality of resource groups based on deviations in performance data between the resources,
utilizing the processor to analyze the performance data for each of the divided resource groups,
wherein the plurality of resources are constituted by a plurality of hierarchies with a resource belonging to one of the plurality of hierarchies as a node,
utilizing the processor to determine a number of the resource groups based on a number of the nodes, and utilizing the processor to divide the plurality of resources into the plurality of resource groups based on the deviations in performance data between the resources and the number of the nodes, utilizing the processor to acquire values of a plurality of metrics for each of the resources as the performance data of the resource from the computer system, utilizing the processor to accumulate the acquired value for each of the metrics in a time-series manner, and utilizing the processor to calculate a correlation between a change of the accumulated value of the metric along with a lapse of time and a change of the accumulated value of the other metric along with the lapse of time to obtain the deviations in performance data between the resources.

2. The performance analysis method according to claim 1, wherein the plurality of resources constitute a plurality of resource hierarchies in the computer system, and wherein the method additionally comprises utilizing the processor to set the number of resource groups as a number of nodes which is a minimum number of resources for each of the resource hierarchies.

3. The performance analysis method according to claim 1, wherein the computer system comprises a storage device including a plurality of storage pools, and wherein the method additionally comprises utilizing the processor to set a number of the plurality of storage pools as the number of the nodes.

4. The performance analysis method according to claim 1, wherein the method additionally comprises utilizing the processor to set a preset number as the number of the nodes.

5. The performance analysis method according to claim 1, wherein the method additionally comprises utilizing the processor to select one representative metric from among the plurality of metrics of one of the accumulated resources to select the representative metric for each of the plurality of accumulated resources, and to calculate a correlation between a change of a value of the representative metric along with a lapse of time and a change of a value of the other representative metric along with the lapse of time to obtain the deviations in performance data between the resources.

6. The performance analysis method according to claim 5, wherein the method additionally comprises utilizing the processor to calculate the correlation between the change of the value of the representative metric along with the lapse of time and the change of the value of the other representative metric along with the lapse of time to obtain the deviations in performance data between the resources, to divide the plurality of representative metrics into the plurality of resource groups based on the obtained deviations in performance data between the resources, and to divide the other metrics of the resource to which each of the representative metrics belongs into the same resource group as each of the representative metrics to divide the plurality of resources into the plurality of resource groups.

7. The performance analysis method according to claim 1, wherein the method additionally comprises utilizing the processor to record the plurality of resource groups, to compare the plurality of recorded resource groups, and to change the resource group for analysis of the performance data when there is a difference exceeding a preset threshold between the plurality of compared resource groups.

8. The performance analysis method according to claim 7, wherein the method additionally comprises utilizing the processor to perform learning for each of the divided resource groups to create a mathematical model, and to perform evaluation for each of the divided resource groups using the created mathematical model to analyze the performance data.

9. The performance analysis method according to claim 8, wherein the method additionally comprises utilizing the processor to change the resource group for analysis of the performance data when there is the difference exceeding the preset threshold between the plurality of compared resource groups, and to stop the evaluation when the resource group is changed in a course of the evaluation.

10. A management computer that analyzes performance of a computer system constituted by a plurality of resources, the management computer comprising:

a processor; and a memory device in which a program to be executed by the processor is stored, wherein the processor divides the plurality of resources of the computer system into a plurality of resource groups based on deviations in performance data between the resources, and analyzes the performance data for each of the divided resource groups wherein the plurality of resources are constituted by a plurality of hierarchies with a resource belonging to one of the plurality of hierarchies as a node, the processor determines a number of the resource groups based on a number of the nodes, and divides the plurality of resources into the plurality of resource groups based on the deviations in performance data between the resources and the number of the nodes, and, wherein the processor acquires values of a plurality of metrics for each of the resources as the performance data of the resource from the computer system, accumulates the acquired value for each of the metrics in a time-series manner, and calculates a correlation between a change of the accumulated value of the metric along with a lapse of time and a change of the accumulated value of the other metric along with the lapse of time to obtain the deviations in performance data between the resources.

* * * * *